US009847046B2

(12) United States Patent
Jeon et al.

(10) Patent No.: US 9,847,046 B2
(45) Date of Patent: Dec. 19, 2017

(54) DISPLAY APPARATUS AND METHOD OF TESTING THE SAME

(71) Applicant: Samsung Display Co., Ltd., Yongin-City, Gyeonggi-Do (KR)

(72) Inventors: Junhyuck Jeon, Cheonan-si (KR); Soyoung Myoung, Bucheon-si (KR); DongJoon Lim, Asan-si (KR); Myoungho Hwang, Asan-si (KR)

(73) Assignee: Samsung Display Co., Ltd. (KR)

( * ) Notice: Subject to any disclaimer, the term of this patent is extended or adjusted under 35 U.S.C. 154(b) by 86 days.

(21) Appl. No.: 14/691,437

(22) Filed: Apr. 20, 2015

(65) Prior Publication Data

US 2016/0011108 A1 Jan. 14, 2016

(30) Foreign Application Priority Data

Jul. 9, 2014 (KR) ........................ 10-2014-0086200

(51) Int. Cl.
*G01N 21/552* (2014.01)
*G09G 3/00* (2006.01)
*G09G 3/36* (2006.01)

(52) U.S. Cl.
CPC ........... *G09G 3/006* (2013.01); *G09G 3/3648* (2013.01)

(58) Field of Classification Search
CPC ..... G01N 21/553; G09G 3/006; G09G 3/3648
See application file for complete search history.

(56) References Cited

U.S. PATENT DOCUMENTS 6,690,433 B2 * 2/2004 Yoo ................... G02F 1/136204 349/40
7,297,979 B2 * 11/2007 Lim .................. G02F 1/136259 257/355
2006/0109472 A1 * 5/2006 Muraishi .............. G01N 21/553 356/445
2006/0125743 A1 * 6/2006 Lee ...................... G09G 3/3688 345/80
2010/0134137 A1 * 6/2010 Kida ..................... G02F 1/1309 324/757.01
2010/0238368 A1 * 9/2010 Kim .................... G02F 1/13458 349/40
2011/0079782 A1 * 4/2011 Kim .................. G02F 1/133516 257/59
2013/0120743 A1 5/2013 Turker et al.
2013/0182343 A1 7/2013 Naya et al.
2013/0228887 A1 9/2013 Wehner et al.
2014/0183582 A1 * 7/2014 Lee ........................ H01L 33/50 257/98

FOREIGN PATENT DOCUMENTS

| | | |
|---|---|---|
| JP | 2011-232149 | 11/2011 |
| JP | 4810304 | 11/2011 |
| JP | 2012-032282 | 2/2012 |
| KR | 10-2007-0027095 | 3/2007 |
| KR | 10-1259646 | 4/2013 |

* cited by examiner

*Primary Examiner* — Sang Nguyen
(74) *Attorney, Agent, or Firm* — Innovation Counsel LLP

(57) ABSTRACT

A display apparatus includes a base substrate and a test device group. The base substrate includes a display area in which a plurality of pixels connected to a plurality of signal lines is disposed and a peripheral area disposed adjacent to the display area. The test device group includes a first pad on which a surface plasmon resonance is induced due to an electromagnetic wave incident to the first pad. The first pad is disposed in the peripheral area and completely covered by an insulating layer.

11 Claims, 12 Drawing Sheets

DISPLAY APPARATUS AND METHOD OF TESTING THE SAME

CROSS-REFERENCE TO RELATED APPLICATION

This U.S. non-provisional patent application claims priority under 35 U.S.C. §119 to Korean Patent Application No. 10-2014-0086200, filed on Jul. 9, 2014, the contents of which are hereby incorporated by reference in its entirety.

BACKGROUND

1. Field of Disclosure

The present disclosure relates to a display apparatus and a method of testing the same. More particularly, the present disclosure relates to a display apparatus capable of testing electrical characteristics thereof and a method of testing the display apparatus.

2. Description of the Related Art

In recent years, various display apparatuses, such as a liquid crystal display apparatus, an organic electroluminescent display apparatus, an electrowetting display apparatus, a plasma display apparatus, an electrophoretic display apparatus, etc., have been developed.

The display apparatus is manufactured through various processes. The manufacturing processes of the display apparatus include a test process to monitor process results, e.g., thickness, resistance, concentration, contamination, critical measurement, electrical characteristic of elements.

To prevent the elements from being damaged during the test process, the electrical characteristics of the display apparatus is evaluated by measuring characteristics of test devices formed in a certain area or a separate blank area of the display apparatus.

SUMMARY

The present disclosure provides a display apparatus having a test pad that causes a surface plasmon resonance phenomenon with respect to an electromagnetic wave.

The present disclosure provides a method of testing the display apparatus to evaluate electrical characteristics of the display apparatus in a non-contact scheme using the electromagnetic wave.

Embodiments of the inventive concept provide a display apparatus including a base substrate and a test device group. The base substrate includes a display area in which a plurality of pixels connected to a plurality of signal lines is disposed and a peripheral area disposed adjacent to the display area. The test device group includes a first pad on which a surface plasmon resonance is induced due to an electromagnetic wave incident to the first pad, the first pad being disposed in the peripheral area and completely covered by an insulating layer.

The electromagnetic wave is a polarization light in a transverse magnetic mode

The display apparatus further includes a prism disposed on a rear surface of the base substrate to overlap with the first pad and to receive the electromagnetic wave, and the first pad is disposed on a front surface of the base substrate, which is opposite to the rear surface.

The prism has a shape integrally formed with the base substrate.

The first pad is connected to one of the plurality of signal lines.

The first pad is disposed on a same layer as the plurality of signal lines.

The test device group further includes a test circuit part connected to the first pad and a second pad connected to the test circuit part, and the second pad is exposed from the insulating layer.

The test circuit part includes a test signal line in which one end thereof is connected to the first pad and the other end thereof is connected to the second pad, and the test signal line has substantially a same linear resistance as that one of the plurality of signal lines.

The first pad is disposed on a same layer as the test signal line.

The test circuit part includes a first electrode connected to the first pad and a second electrode connected to the second pad to overlap with the first electrode, and the insulating layer is disposed between the first and second electrodes.

The test device group further includes a third pad connected to the test circuit part, spaced apart from the first and second pads, and exposed from the insulating layer, and the test circuit part includes a control electrode connected to the first pad, an input electrode connected to the second pad, and an output electrode connected to the third pad.

The first pad is disposed on a same layer as the control electrode.

Embodiments of the inventive concept provide a method of testing a display apparatus, which includes a base substrate including a display area, in which a plurality of pixels connected to a plurality of signal lines is disposed, and a peripheral area disposed adjacent to the display area and a test pad disposed in the peripheral area, connected to the plurality of signal lines, and covered by an insulating layer, including irradiating an electromagnetic wave to the test pad to generate a surface electric charge due to a surface plasmon resonance and measuring an electrical characteristic of the plurality of signal lines activated by the surface electric charge induced to the test pad.

The measuring of the electrical characteristic of the signal lines includes providing an electric field sensor to the display area to sense an electric field generated in the plurality of signal lines and checking a signal line, from which the electric field is not sensed, among the plurality of signal lines to detect an opened signal line among the plurality of signal lines.

The measuring of the electrical characteristic of the plurality of signal lines includes detecting a pixel displaying a pixel image among the pixels connected to the plurality of signal lines and determining a pixel displaying a different pixel image among the plurality of pixels to detect an opened signal line among the plurality of signal lines.

Embodiments of the inventive concept provide a method of testing a display apparatus, which includes a base substrate including a display area, in which a plurality of pixels connected to a plurality of signal lines is disposed, and a peripheral area disposed adjacent to the display area, a first pad connected to the plurality of signal lines and covered by an insulating layer, a second pad exposed from the insulating layer, and a test circuit part connected to the first and second pads and disposed in the peripheral area, including irradiating an electromagnetic wave to the first pad to generate a surface electric charge due to a surface plasmon resonance and measuring an electrical characteristic of the test circuit part activated by the surface electric charge.

The test circuit part is a test conductive line in which one end thereof is connected to the first pad and the other end thereof is connected to the second pad, and the measuring of the electrical characteristic of the test circuit part includes receiving an electrical signal generated by the surface electric charge and provided through the second pad to test a line resistance of the test circuit part.

The test circuit part includes a first electrode connected to the first pad and a second electrode connected to the second pad and overlapped with the first electrode such that the insulating layer is disposed between the first and second electrodes. A capacitance of the test circuit part is measured by determining an electric potential difference between the first and second electrodes, which is generated in response to an electric potential of the first electrode induced by the surface electric charge.

The method further includes a third pad exposed from the insulating layer and the test circuit part comprises a thin film transistor which includes a control electrode connected to the first pad, an input electrode connected to the second pad, and an output electrode connected to the third pad. The measuring of the electrical characteristic of the test circuit part includes determining a current flowing through the second and third pads to check an electrical characteristic of the thin film transistor.

According to the above, the electrical characteristics of the display apparatus may be tested using a non-contact scheme. The display apparatus includes a test device group to test characteristics of elements included in the display apparatus using the surface plasmon resonance phenomenon caused by the electromagnetic wave.

The display apparatus may check the open of the signal lines, manufacturing errors of the signal lines, and manufacturing errors of the thin film transistor. Since the test method of the display apparatus is performed by the non-contact scheme, the display apparatus may be prevented from being damaged during the test process.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1:
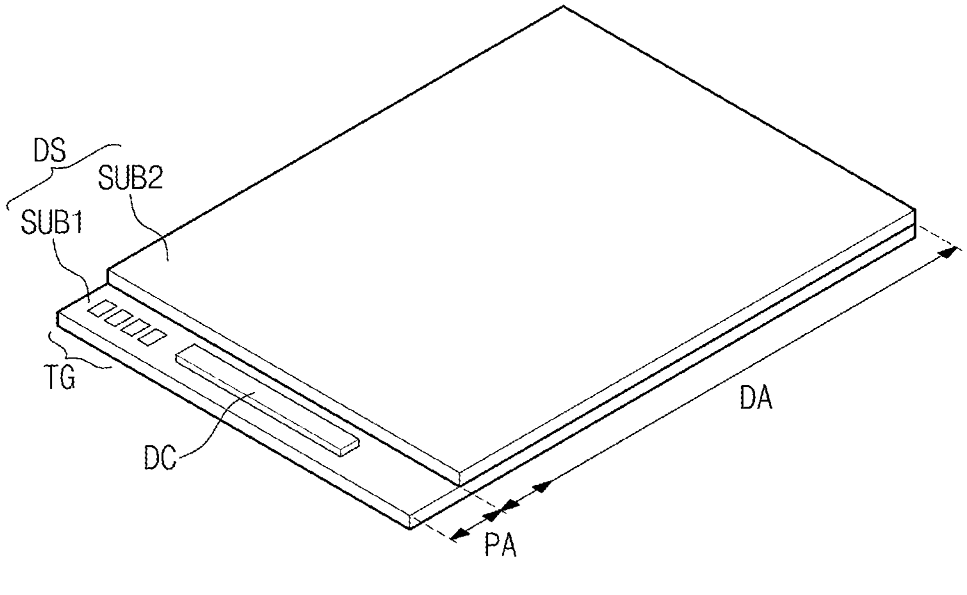
FIG. 1 is a perspective view showing a display apparatus according to an exemplary embodiment of the present disclosure.

It will be understood that when an element or layer is referred to as being "on", "connected to" or "coupled to" another element or layer, it can be directly on, connected or coupled to the other element or layer, or intervening elements or layers may be present between the element or layer and the another element or layer. In contrast, when an element is referred to as being "directly on," "directly connected to" or "directly coupled to" another element or layer, there are no intervening elements or layers present between the element or layer and the another element or layer. Like numbers refer to like elements throughout this specification. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 2:
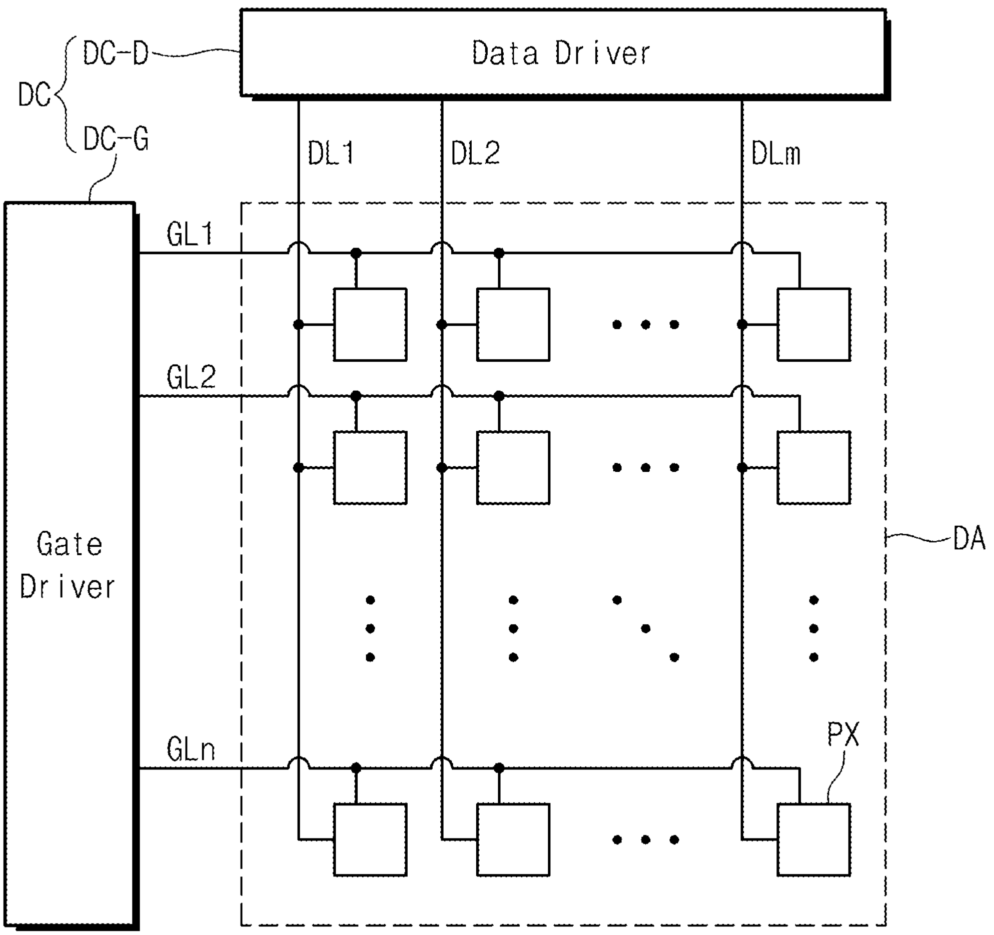
FIG. 2 is a block diagram showing the display apparatus shown in FIG. 1.
Figure 3:
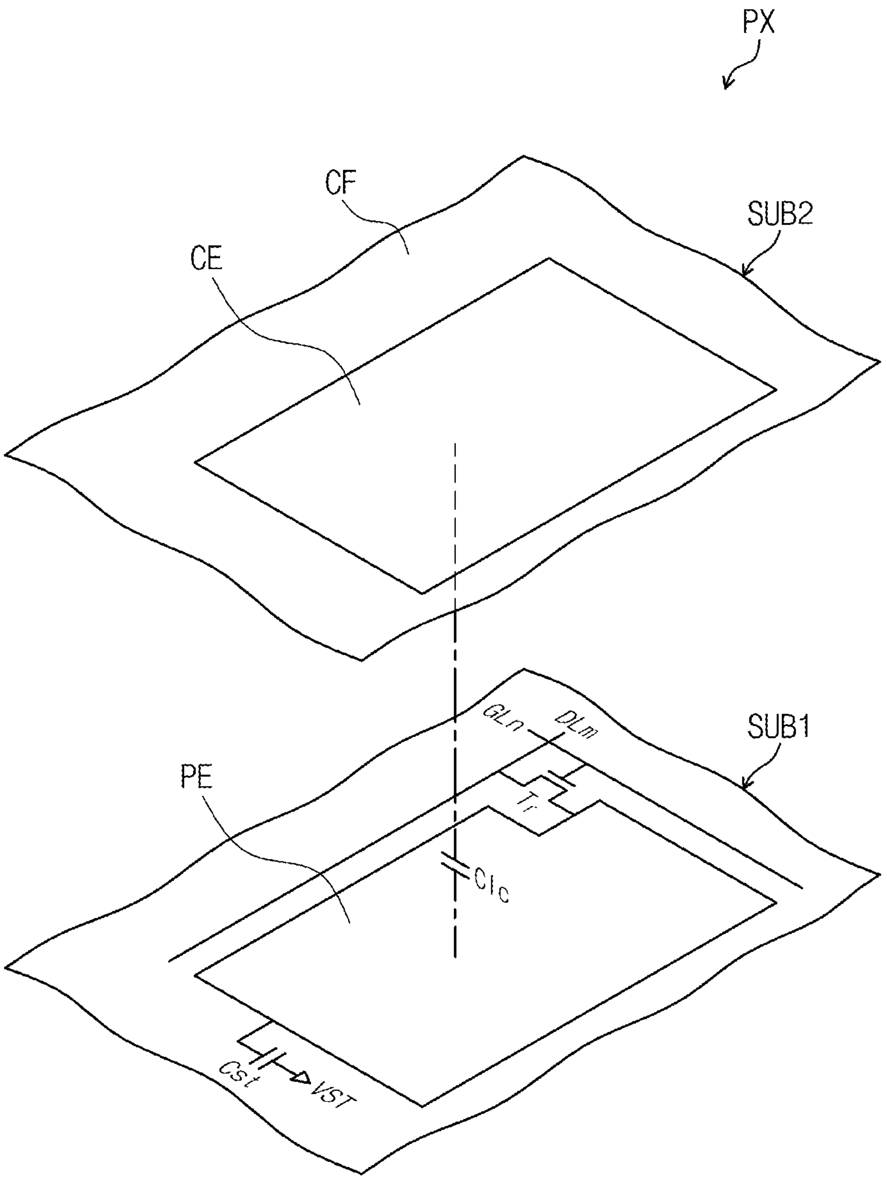
FIG. 3 is a perspective view showing one pixel shown in FIG. 2.

FIG. 1 is a perspective view showing a display apparatus DS according to an exemplary embodiment of the present disclosure, FIG. 2 is a block diagram showing the display apparatus DS shown in FIG. 1, and FIG. 3 is a perspective view showing one pixel PX shown in FIG. 2.

Referring to FIGS. 1 to 3, the display apparatus DS includes various devices. For instance, the display apparatus may be, but not limited to, a liquid crystal display apparatus including a liquid crystal device, an organic light emitting display apparatus including an organic light emitting device, or an electrophoretic display apparatus including an electrophoretic device. In the present exemplary embodiment, the liquid crystal display apparatus will be described as the display apparatus DS.

The display apparatus DS includes a first substrate SUB1, a second substrate SUB2, and a liquid crystal layer (not shown) disposed between the first substrate SUB1 and the second substrate SUB2. The display apparatus DS includes a display area DA and a peripheral area PA when viewed in a plan view. The peripheral area PA is disposed adjacent to the display area DA.

The display area DA displays an image in response to electrical signals applied thereto. The display area DA includes a plurality of pixels PXs arranged therein. The first substrate SUB1 is overlapped with the second substrate SUB2 in the display area DA.

The peripheral area PA does not display the image even though electrical signals are applied to the peripheral area PA. The peripheral area PA of the first substrate SUB1 is not overlapped with the second substrate SUB2 and exposed to the outside of the second substrate SUB2. The peripheral area PA includes a test device group TG and a driving circuit part DC, which area disposed therein.

The test device group TG is used to test electrical characteristics of the display device DS. The test device group TG includes at least one pattern. The pattern is formed through the same processes of manufacturing processes of devices included in the display apparatus DS, which are applied to form a device that is to be a test target. In the display apparatus DS according to the present exemplary embodiment, the device, which is to be the test target, or the process of forming the device is tested using the test device group TG.

The test device group TG may be provided in a plural number. In the present exemplary embodiment, the display apparatus DS includes four test device groups. The test device groups are used to test the electrical characteristics of different devices of the display apparatus DS. Detailed descriptions of the test device groups will be described later.

The driving circuit part DC is disposed adjacent to the test device group TG in the peripheral area PA. The driving circuit part DC applies electrical signals to the display area DA. The driving circuit part DC includes a gate driver DC-G and a data driver DC-D.

The gate driver DC-G applies a gate signal to the display area DA and the data driver DC-D applies a data signal corresponding to image data to the display area DA. The pixels PXs display the image in response to the gate and data signals respectively provided from the gate driver DC-G and the data driver DC-D.

The first substrate SUB1 includes a plurality of signal lines, a base substrate (not shown) on which the signal lines are disposed and an insulating layer (not shown) covering the signal lines. The signal lines include gate lines GL1 to GLn and data lines DL1 to DLm. The signal lines are connected to the pixels PX to apply the electrical signals to the pixels PX. In the present exemplary embodiment, the first substrate SUB1 may be a thin film transistor substrate.

The gate lines GL1 to GLn are connected to the gate driver DC-G. The gate lines GL1 to GLn receive the gate signal from the gate driver DC-G. The gate signal is applied to the pixels PXs through the gate lines GL1 to GLn.

The data lines DL1 to DLm are insulated from the gate lines GL1 to GLn while crossing the gate lines GL1 to GLn. The data lines DL1 to DLm receive the data signal from the data driver DC-D and apply the data signal to the pixels PXs.

The pixels PXs are arranged in the display area DA in a matrix form. Each pixel PX includes a thin film transistor Tr and at least one capacitor. In the present exemplary embodiment, each pixel PX may include a liquid crystal capacitor Clc and a storage capacitor Cst.

The thin film transistor Tr includes a control electrode, an input electrode, and an output electrode. The control electrode is connected to a corresponding gate line of the gate lines GL1 to GLn, the input electrode is connected to a corresponding data line of the data lines DL1 to DLm, and the output electrode is connected to one electrode of the liquid crystal capacitor Clc. The thin film transistor Tr applies the data signal to the liquid crystal capacitor Clc in response to the gate signal.

The liquid crystal capacitor Clc is configured to include a pixel electrode PE, a common electrode CE, and the liquid crystal layer disposed between the pixel electrode PE and the common electrode CE (not shown). The liquid crystal capacitor Clc is charged with a voltage corresponding to a difference in electric potential between voltages respectively applied to the pixel electrode PE and the common electrode CE.

The pixel electrode PE is disposed on the first substrate SUB1. The pixel electrode PE receives the data voltage corresponding to the data signal from the thin film transistor Tr.

The common electrode CE is disposed on the second substrate SUB2. The common electrode CE receives a common voltage from an external source (not shown). However, the position of the common electrode CE should not be limited to the second substrate SUB2. That is, the common electrode CE may be disposed on the first substrate SUB1 according to embodiments.

The liquid crystal layer has a predetermined dielectric constant. An electric field caused by the difference in electric potential between the pixel electrode PE and the common electrode CE is formed in the liquid crystal layer. The liquid crystal layer includes liquid crystal molecules (not shown). The liquid crystal molecules are aligned in a specific direction in response to the electric field. A transmittance of light passing through the liquid crystal layer is controlled by the direction in which the liquid crystal molecules are aligned.

The storage capacitor Cst is connected to the liquid crystal capacitor Clc in parallel. The storage capacitor Cst includes the pixel electrode PE and a storage electrode. The storage electrode receives a storage voltage Vst which corresponds to the common voltage. The storage capacitor Cst allows a data voltage applied to a corresponding pixel of the pixels PXs to be maintained for a predetermined time.

The second substrate SUB2 includes a color filter CF disposed thereon. In the present exemplary embodiment, the second substrate SUB2 may be a color filter substrate. The color filter CF includes a color pattern and a black matrix. The color filter CF assigns a color to the light exiting through the liquid crystal layer. The color filter CF may have different colors depending on the pixels. However, the position of the color filter CF should not be limited to the second substrate SUB2. That is, the color filter CF may be disposed on the first substrate SUB1 according to embodiments.

Figure 4:
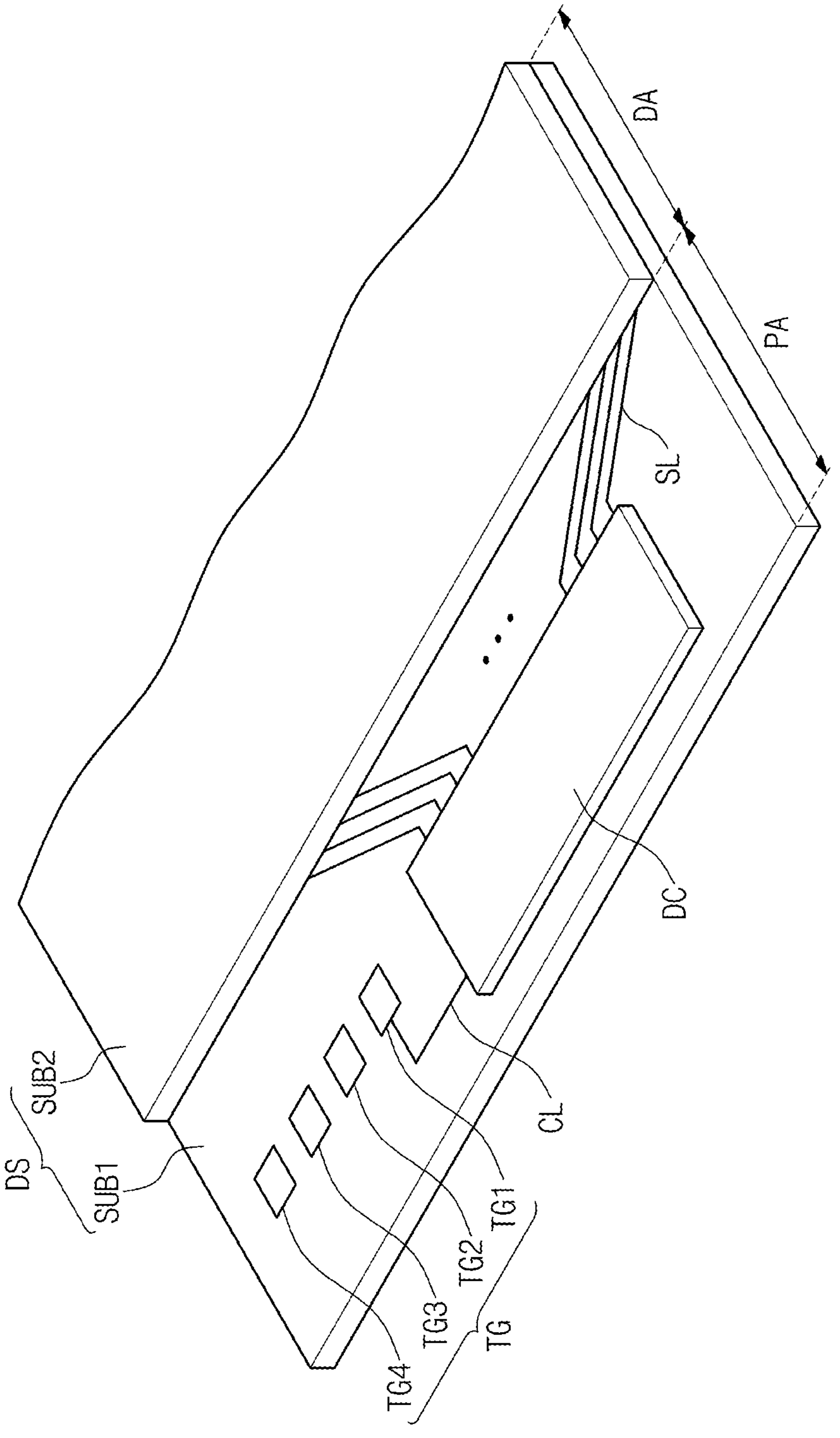
FIG. 4 is a perspective view showing a portion of the display apparatus shown in FIG. 1.
Figure 5:
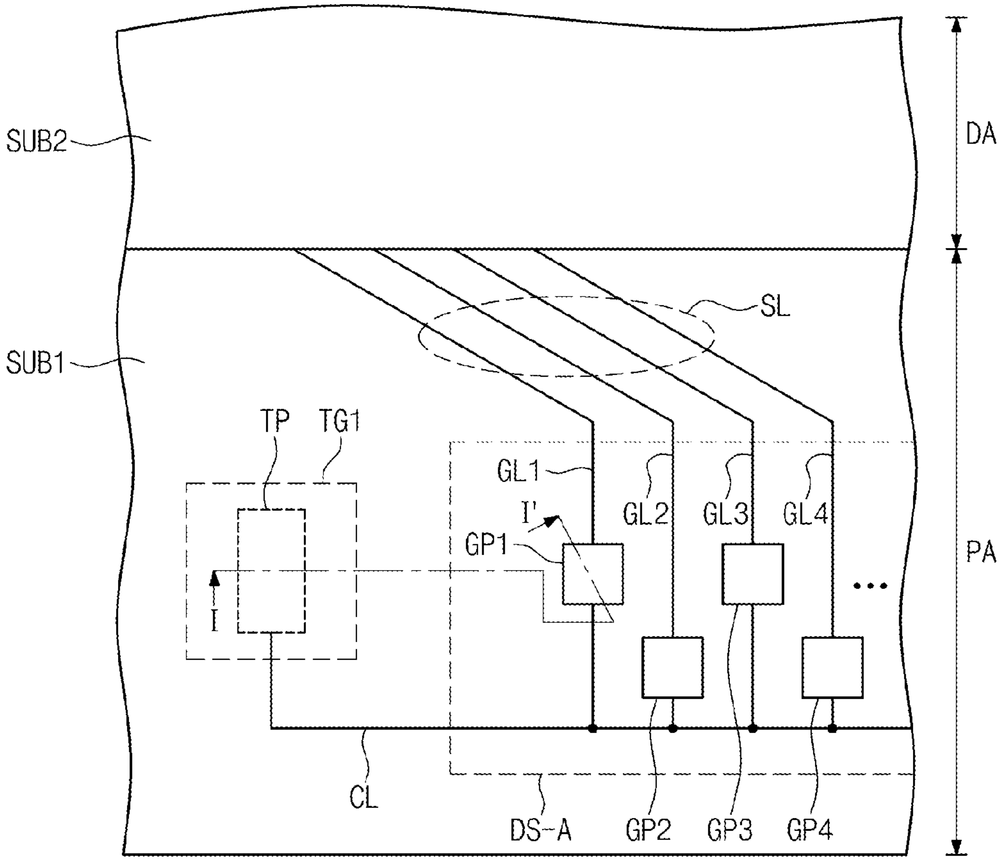
FIG. 5 is a plan view showing a test device group according to an exemplary embodiment of the present disclosure.
Figure 6:
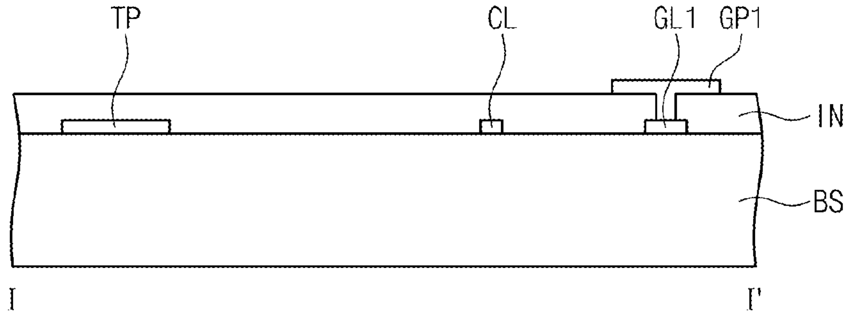
FIG. 6 is a cross-sectional view taken along a line I-I' shown in FIG. 5.

FIG. 4 is a perspective view showing a portion of the display device shown in FIG. 1, FIG. 5 is a plan view showing a test device group according to an exemplary embodiment of the present disclosure, and FIG. 6 is a cross-sectional view taken along a line I-I' shown in FIG. 5.

Referring to FIGS. 4 to 6, the display apparatus DS includes the four test device groups TG1 to TG4. The test device groups TG1 to TG4 have different purposes. As another example, the display apparatus DS may include only one test device group or test device groups having the same purpose.

The peripheral area PA includes a driving circuit part area DS-A in which the driving circuit part DC is disposed. One ends of the signal lines SL extending from the display area DA are disposed in the driving circuit part area DC-A.

The signal lines SL may include the gate lines GL1 to GLn and the data lines DL1 to DLm. In the present exemplary embodiment, the gate lines GL1 to GLn will be described as the signal lines SL.

The driving circuit part DC is mounted on the first substrate SUB1. The driving circuit part DC is connected to the signal lines SL extending from the display area DA. The one ends of the signal lines SL are respectively connected to the main pads. The main pads comprise gate pads respectively connected to the gate lines and data pads respectively connected to the data lines. In this case, the gate pads GP1 to GP4 are exemplary explained.

The gate pads GP1 to GP4 are respectively connected to the gate lines GL1 to GLn. The gate pads GP1 to GP4 make contact with a bump (not shown) of the driving circuit part DC to electrically connect the driving circuit part DC and the signal lines SL.

Meanwhile, according to another embodiment, the driving circuit part DC may be disposed at the outside of the first substrate SUB1. In this case, the driving circuit part DC is connected to the first substrate SUB1 by a separate flexible film.

The test device group TG may include first to fourth test device groups TG1 to TG4. The first to fourth test device groups TG1 to TG4 are disposed in the vicinity of the driving circuit part DC.

The first test device group TG1 includes a test pad TP. The test pad TP is disposed adjacent to the driving circuit part DC. The test pad TP is connected to the signal lines SL. In this case, the test pad TP is connected to signal lines which are applied with the same signal.

In the present exemplary embodiment, the test pad TP is connected to the gate lines GL1 to GL4. The test pad TP applies the electrical signals to the gate lines GL1 to GL4. The test pad TP is connected to the gate lines GL1 to GL4 through a conductive line CL.

The test pad TP is disposed on the same layer as the gate line GL1. That is, the test pad TP and the gate line GL1 are disposed on the base substrate BS. The insulating layer IN is disposed on the base substrate BS.

The insulating layer IN covers the test pad TP and the gate line GL1. Although not shown in figures, the conductive line CL is disposed on the same layer as the test pad TP and the gate line GL1 and covered by the insulating layer IN.

The gate pad GP1 is not completely covered by the insulating layer IN. The gate pad GP1 is disposed on the insulating layer IN. The gate pad GP1 is connected to the gate line GL1 through a contact hole in the insulating layer N. The gate pad GP1 is exposed to receive the electrical signals from the driving circuit part DC. However, the test pad TP is completely covered by the insulating layer IN. Accordingly, an upper surface of the test pad TP is not exposed to the outside of the insulating layer IN. The test pad TP is electrically insulated from other devices disposed on the insulating layer IN.

Figure 7A:
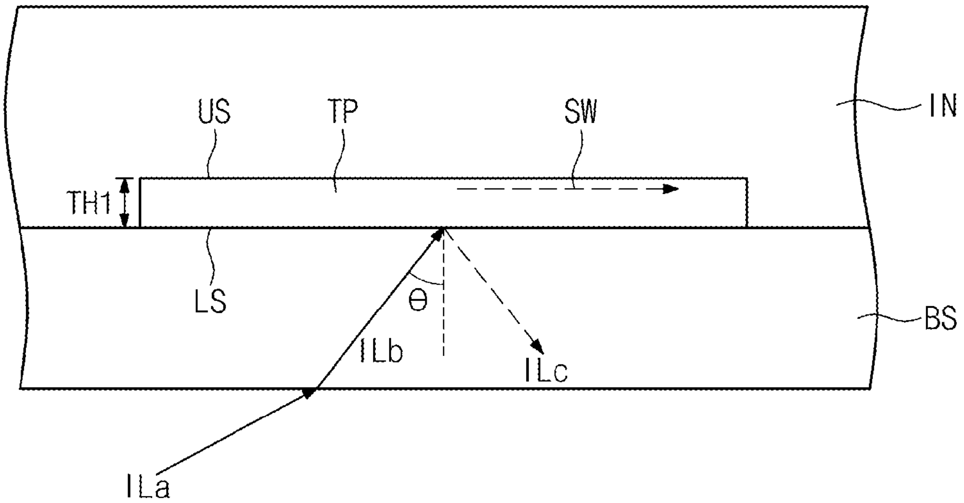
FIG. 7A is a cross-sectional view showing an area in which a test pad is disposed.
Figure 7B:
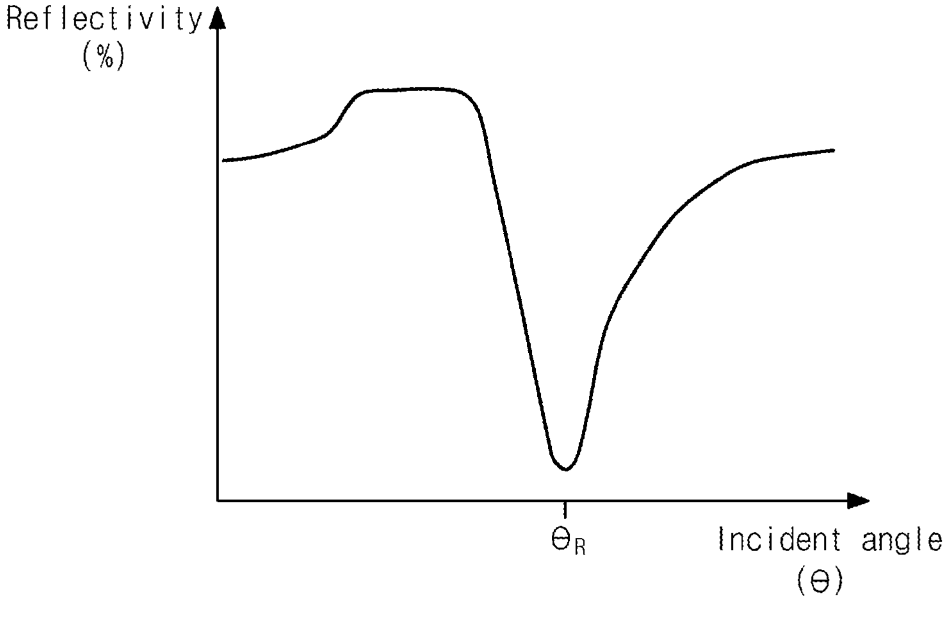
FIG. 7B is a graph showing a reflectivity of an incident light shown in FIG. 7A.

FIG. 7A is a cross-sectional view showing an area in which the test pad TP is disposed and FIG. 7B is a graph showing a reflectivity of an incident light shown in FIG. 7A. Hereinafter, a process of applying the electrical signal to the test pad TP will be described in detail with reference to FIGS. 7A to 7B.

Referring to FIG. 7A, the test pad TP includes a lower surface LS making contact with the base substrate BS and an upper surface US making contact with the insulating layer IN. The test pad TP includes at least one of gold, titanium, molybdenum, and an alloy thereof.

The test pad TP has a thickness of nanoscale. In the present exemplary embodiment, the test pad TP has the thickness TH1 of about 10 nanometers to about 30 nanometers.

A surface plasmon resonance, in which surface electric charges are induced and vibrated, occurs on the surface of the test pad TP. An excitation of the surface plasmon resonance is generated by applying the electric field to an outer portion of a boundary surface between the test pad TP and the insulating layer IN, which have different dielectric constants. In the present exemplary embodiment, the electric field is generated by irradiating an electromagnetic wave to the test pad TP. When the electromagnetic wave is irradiated to the test pad TP, the electric field may be applied to the test pad TP without making contact with the test pad TP. As an example of the electromagnetic wave, the incident light ILa is provided to the base substrate BS. The incident light may be a polarization light in a transverse magnetic mode, which is substantially vertical to the lower surface LS of the test pad TP.

The incident light ILa incident to the base substrate BS is refracted at a predetermined angle according to a refractive index of the base substrate BS while traveling through the base substrate BS. The incident light ILb incident to the test pad TP is inclined at a predetermined incident angle θ with respect to the lower surface LS of the test pad TP. Therefore, the incident angle θ of the incident light ILb incident to the test pad TP is different from an incident angle of the incident light ILa incident to the base substrate BS.

Referring to FIG. 7B, an amount of a reflection light ILc reflected by the test pad TP varies depending on the incident angle θ of the incident light ILb incident to the test pad TP. The incident angle θ exerts influence on the reflectivity of the incident lights ILa and ILb. The reflectivity of the incident lights ILa and ILb with respect to the test pad TP is rapidly reduced at a predetermined angle.

When the incident angle θ is a resonance angle $\theta_R$, the amount of the reflected light ILc becomes minimum. Thus, most of energy of the incident light ILb incident to the test pad TP is absorbed to the test pad TP, and, thus, maximum surface plasmon resonance phenomenon occurs because the vibration of the surface plasmon becomes maximum value when the incident angle θ is a resonance angle $\theta_R$.

When the incident angle θ is a resonance angle $\theta_R$, a surface plasmon wave SW generated by the surface plasmon resonance has a maximum intensity. Different from a conventional electromagnetic wave randomly traveling in a given space, the surface plasmon wave SW travels along the surface of the test pad TP.

In the present exemplary embodiment, the incident light ILa is irradiated to the base substrate BS to allow the incident angle θ of the incident light ILb incident to the test pad TP to have the resonance angle $\theta_R$. Accordingly, the electrical characteristics of the display apparatus may be tested using the surface plasmon wave SW, which has the maximum value, induced to the test pad TP.

Referring to FIGS. 5 and 6, the surface plasmon wave SW induced to the test pad TP travels along the surface of the test pad TP and is applied to the gate lines GL1 to GL4 connected to the test pad TP through the conductive line CL. Therefore, the electrical signals corresponding to the surface plasmon wave SW are applied to the gate lines GL1 to GL4.

The electrical signals are applied to the display area DA through the gate lines GL1 to GL4. Thus, the electric field is induced to the gate lines GL1 to GLn among the signal lines disposed in the display area DA, along which the surface plasmon wave SW travels.

Meanwhile, since the electrical signal is not applied to an opened signal line among the gate lines GL1 to GLn, the electric field is not induced to the opened signal line. The test method of the display apparatus detects the signal line, to which the electric field is not applied, to check whether the signal line is opened or not.

In addition, the electric signals are applied to the pixels PXs through the gate lines GL1 to GLn. The thin film transistors of the pixels PX are turned on by the electrical signals. In this case, when the data voltage is applied to the data lines DL1 to DLn and the light is provided to the rear surface of the base substrate BS, pixel images are displayed in the pixels PXs.

Among the pixels PXs, pixels PXs connected to the opened gate lines do not display the pixel images. The pixels, in which the pixel images are not displayed, appear as a line defect corresponding to the gate line. The test method of the display apparatus according to the present exemplary embodiment may check whether the signal line is opened or not by detecting the line defect.

The display apparatus DS and the test method of the display apparatus DS may cause the surface plasmon resonance using the light since they include the test pad TP completely covered by the insulating layer IN. Accordingly, the electrical characteristics of the display apparatus DS may be tested through the non-contact scheme, and thus the display apparatus DS may be prevented from being damaged during the test process. In addition, since the electric field is induced using the light which does not require a wide test pad TP for contacting a tip of a test apparatus, an area of test pad TP may be reduced.

Figure 8:
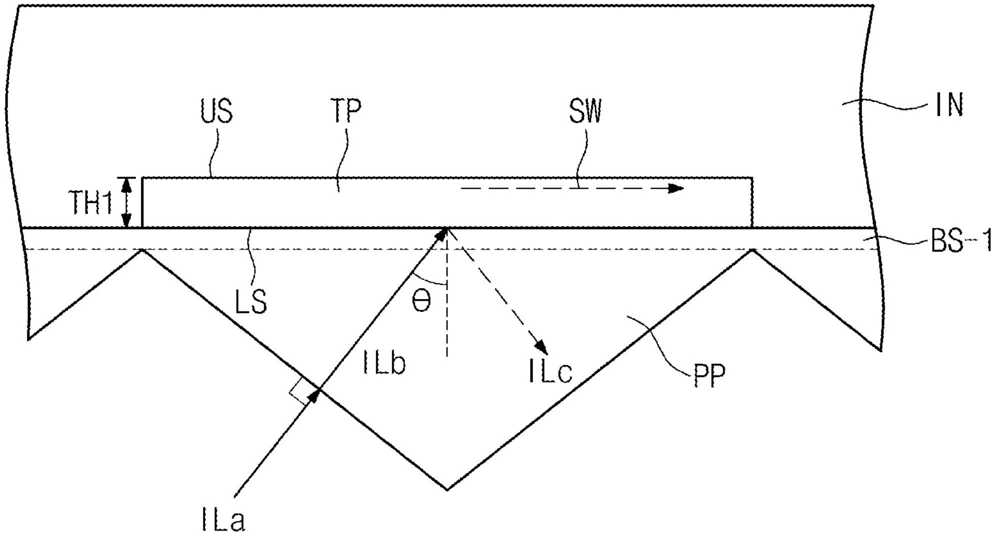
FIG. 8 is a cross-sectional view showing a portion of a display apparatus according to an exemplary embodiment of the present disclosure.

FIG. 8 is a cross-sectional view showing a portion of a display apparatus according to an exemplary embodiment of the present disclosure. The display apparatus has the same structure and function as those of the display apparatus shown in FIGS. 1 to 7 except for the base substrate. In FIG. 8, the same reference numerals denote the same elements in FIGS. 1 to 7, and thus detailed descriptions of the same elements will be omitted.

Referring to FIG. 8, the display apparatus further includes a prism PP. In the present exemplary embodiment, the prism PP is integrally formed with the base substrate BS-1, but it should not be limited thereto or thereby. That is, according to another embodiment, the prism PP is separately provided to the base substrate BS and disposed on the rear surface of the base substrate BS.

As described above, the incident light is required to be incident to the test pad TP at the resonance angle $\theta_R$ such that the maximum surface electric charges are excited and the maximum surface plasmon wave is generated. In a case that the rear surface of the base substrate BS-1 is flat and the incident angle θ of the incident light is smaller than a predetermined angle, the incident light is easy of total internal reflection by the surface of the base substrate BS-1. Accordingly, the incident light ILa incident to the rear surface of the base substrate BS-1 is reflected by the base substrate BS-1 without reaching the test pad TP. Although the incident light ILa is incident to the base substrate BS-1 at an incident angle greater than the predetermined angle, the incident light ILa is refracted by the refractive index of the base substrate BS-1, and thus the incident angle θ of the incident light ILa varies when the incident light ILa reaches to the lower surface LS of the test pad TP.

A surface of the prism PP is inclined at a predetermined angle with respect to the surface of the test pad TP. Therefore, the incident light ILa, which is incident at a predetermined angle with respect to the lower surface LS of the test pad TP, is incident to the surface of the prism PP at a right angle to the surface of the prism surface PP.

For instance, when the incident light ILa is vertically incident to the surface of the prism PP, the incident light ILa reaches to the lower surface LS of the test pad TP without changing the angle of incidence of the light ILa. Thus, the incident angle θ of the light reaching to the test pad TP may be easily controlled by adjusting the angle of the prism PP.

Accordingly, since the display apparatus according to the present exemplary embodiment further includes the prism PP, the incident light ILa easily reaches to the test pad TP. In addition, the prism PP may easily control the incident angle θ of the incident light ILa such that the incident light ILa is incident to the test pad TP at the resonance angle $\theta_R$.

Figure 9A:
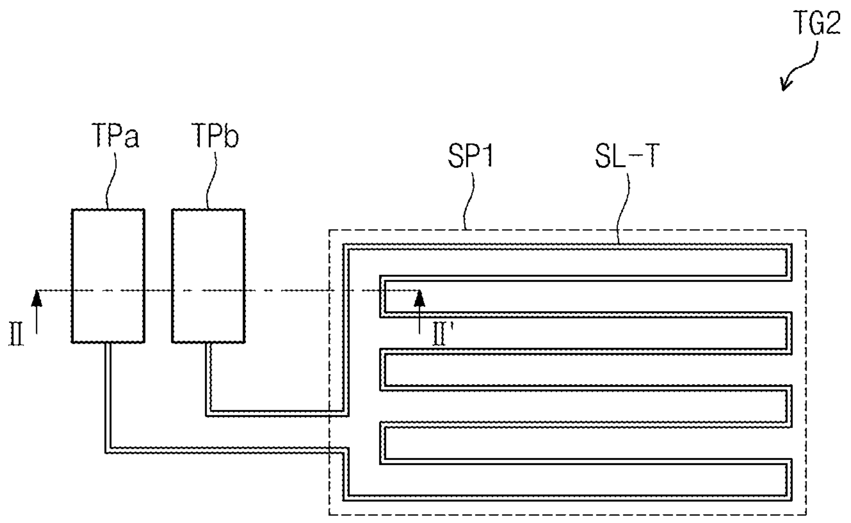
FIG. 9A is a plan view showing a test device group according to an exemplary embodiment of the present disclosure.
Figure 9B:
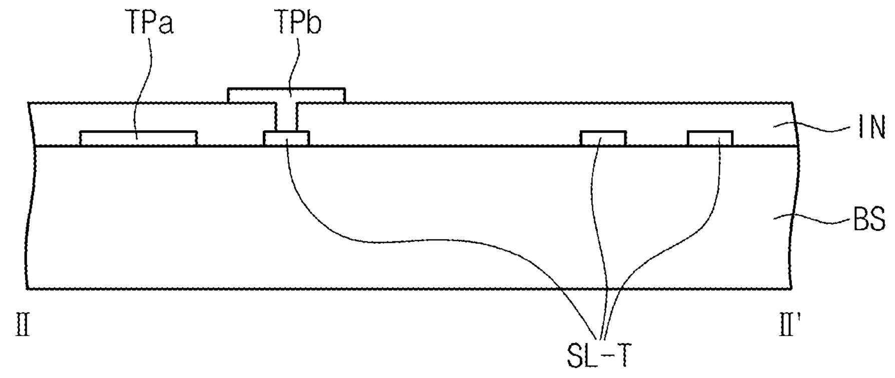
FIG. 9B is a cross-sectional view taken along a line II-II' shown in FIG. 9A.

FIG. 9A is a plan view showing a second test device group TG2 according to an exemplary embodiment of the present disclosure and FIG. 9B is a cross-sectional view taken along a line II-II' shown in FIG. 9A. Hereinafter, the second test group TG2 will be described in detail with reference to FIGS. 9A and 9B.

Referring to FIGS. 9A and 9B, the second test device group TG2 includes a first pad TPa, a second pad TPb, and a test circuit part SP1 connected to the first and second pads TPa and TPb. In the present exemplary embodiment, the test circuit part SP1 includes a test signal line SL-T.

The first pad TPa is connected to one end of the test signal line SL-T and completely covered by an insulating layer IN. The second pad TPb is connected to the other end of the test signal line SL-T and exposed to the outside of the insulating layer IN.

The test signal line SL-T is disposed in a variety of shapes. The test signal line SL-T is substantially simultaneously formed with one of the signal lines SL (refer to FIG. 5) through the same process. Accordingly, the test signal line SL-T has substantially the same line resistance as that of the one signal line of the signal lines SL.

A line resistance of a conductive line is determined by a width and height of the conductive line and is inversely proportional to a cross-sectional area of the conductive line. Therefore, as the cross-sectional area of the conductive line increases, the line resistance of the conductive line decreases.

In addition, the line resistance of the conductive line varies depending on a property of materials used to form the conductive line. For instance, as an electrical conductivity of the material for the conductive line becomes high, the line resistance of the conductive line becomes low.

That is, the test signal line SL-T has the same cross-sectional area as that of a selected conductive line of the signal lines SL, e.g., the gate lines GL1 to GLn or the data lines DL1 to DLm, and is formed of the same material as that of the selected conductive line. The test method of the display apparatus may test the linear resistance of the signal lines SL using the second test device group TG2.

When the light is irradiated to the first pad TPa, the surface electric charges are induced on the first pad TPa due to the surface plasmon resonance phenomenon and the surface plasmon wave is applied to the test circuit part SP1. The surface plasmon wave is applied to the second pad TPb via the test circuit part SP1.

The test method of the display apparatus senses the second pad TPb to test the electrical characteristics of the test circuit part SP1. As another way, the test method of the display apparatus may provide the test circuit part SP1 with an electric field sensor to test characteristics of the line resistance of the test circuit part SP1.

Figure 10A:
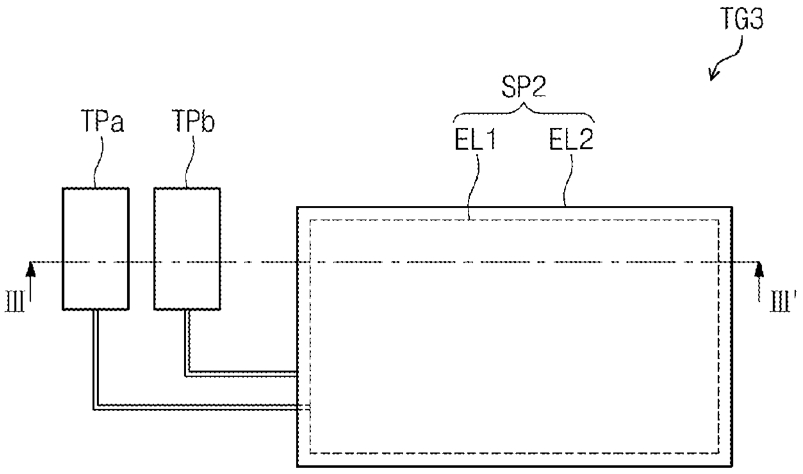
FIG. 10A is a plan view showing a test device group according to an exemplary embodiment of the present disclosure.
Figure 10B:
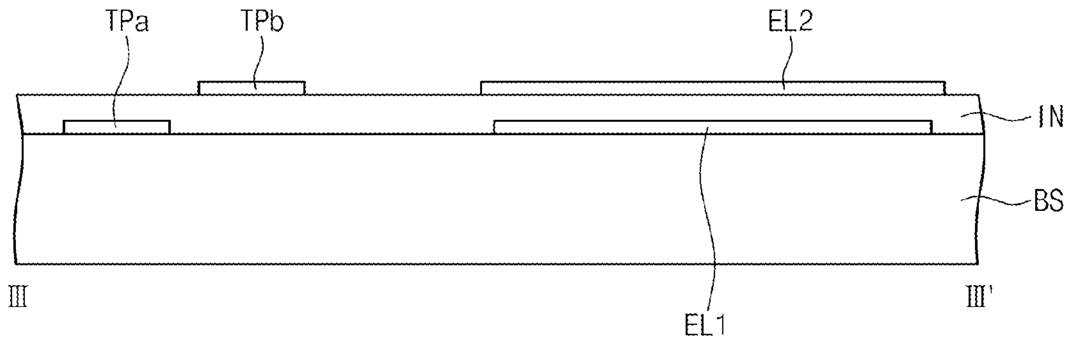
FIG. 10B is a cross-sectional view taken along a line III-III' shown in FIG. 10A.

FIG. 10A is a plan view showing a third test device group TG3 according to an exemplary embodiment of the present disclosure and FIG. 10B is a cross-sectional view taken along a line III-III' shown in FIG. 10A. Hereinafter, the third test device group TG3 will be described in detail with reference to FIGS. 10A and 10B.

Referring to FIGS. 10A and 10B, the third test device group TG3 includes a first pad TPa, a second pad TPb, and a test circuit part SP2. The first pad TPa is disposed on the base substrate BS and completely covered by the insulating layer IN. The second pad TPb is disposed on the insulating layer IN and exposed to the outside of the insulating layer IN.

The test circuit part SP2 includes a first electrode EL1 and a second electrode EL2. The first electrode EL1 is connected to the first pad TPa and disposed on the same layer as the first electrode EL1.

The second electrode EL2 is disposed on the insulating layer IN and overlapped with the first electrode EL1. The second electrode EL2 is connected to the second pad TPb to receive a predetermined voltage from the second pad TPb.

Although not shown in figures, a predetermined insulating layer may be disposed on the second electrode EL2. The insulating layer protects the second electrode EL2 from external impacts. In this case, the second pad TPb is not completely covered by the insulating layer. The second pad TPb is connected to the second electrode EL2 through the conductive line CL.

The third test device group TG3 is used to test dielectric characteristics of the insulating layer IN. For instance, the surface electric charges are induced to the first pad TPa due to the surface plasmon resonance phenomenon and the first electrode EL1 has a voltage corresponding to the induced surface electric charges.

In this case, the second electrode EL2 has a voltage that varies depending on an electric potential of the first electrode EL1. For instance, when the electric potential of the first electrode EL1 increases by the surface electric charges, the electric potential of the second electrode EL2 increases by the increase of the electric potential of the first electrode EL1. The test method of the display apparatus measures a variation in electric potential of the second electrode EL2 to test the dielectric characteristics of the insulating layer IN.

As another way, when a predetermined voltage is applied to the second electrode EL2, an electric field caused by a difference in voltage between the first and second electrodes EL1 and EL2 is applied to the insulating layer IN. The electric field varies depending on a thickness of the insulating layer IN or a material used to form the insulating layer IN. Therefore, the test method of the display apparatus may test the dielectric characteristics of the insulating layer IN by sensing the third test device group TG3.

Figure 11A:
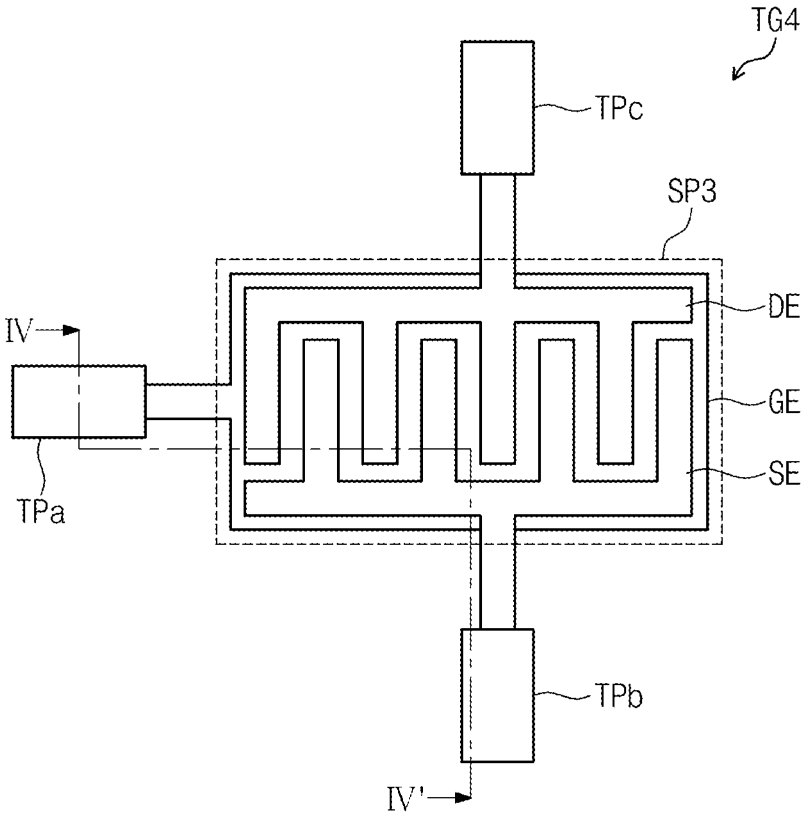
FIG. 11A is a plan view showing a test device group according to an exemplary embodiment of the present disclosure.
Figure 11B:
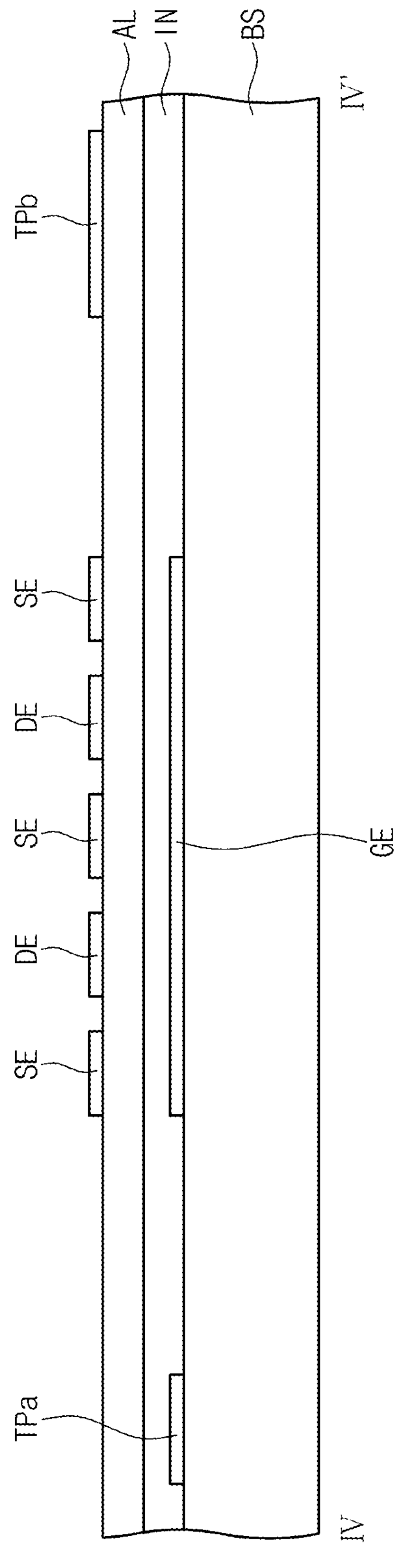
FIG. 11B is a cross-sectional view taken along a line IV-IV' shown in FIG. 11A.

FIG. 11A is a plan view showing a fourth test device group TG4 according to an exemplary embodiment of the present disclosure and FIG. 11B is a cross-sectional view taken along a line IV-IV' shown in FIG. 11A. Hereinafter, the fourth test device group TG4 will be described in detail with reference to FIGS. 11A and 11B.

Referring to FIGS. 11A and 11B, the fourth test device group TG4 includes a first pad TPa, a second pad TPb, a third pad TPc, and a test circuit part SP3. The first, second, and third pads TPa, TPb, and TPc are arranged to be spaced apart from each other. The test circuit part SP3 may include a test thin film transistor.

The first pad TPa is connected to a control electrode GE of the test thin film transistor SP3. The first pad TPa is disposed on the same layer as the control electrode GE and completely covered by the insulating layer IN.

The second pad TPb is connected to an input electrode SE of the test thin film transistor SP3 and the third pad TPc is connected to an output electrode DE of the test thin film transistor SP3.

The control electrode GE is completely covered by the insulating layer N. A semiconductor layer AL is disposed on the insulating layer IN. The input electrode SE and the output electrode DE are disposed on the semiconductor layer AL.

The insulating layer IN includes a gate insulating layer of the thin film transistor. In addition, the insulating layer IN includes a passivation layer that covers the thin film transistor.

The semiconductor layer AL is formed by extending the semiconductor layer AL of the thin film transistor of the pixels PX disposed in the display area DA. The semiconductor layer AL may be partially formed in the fourth test device group TG4 among the first to fourth test device groups TG1 to TG4 using a separate mask.

The fourth test device group TG4 is used to test the electrical characteristics of the thin film transistor included in the display apparatus. The test method of the display apparatus may test channel characteristics of the test thin film transistor SP3.

To this end, the surface plasmon resonance phenomenon is generated on the first pad TPa and currents flowing through the second and third pads TPb and TPc are measured. When a predetermined electrical signal is applied to the first pad TPa due to the surface plasmon wave according to the surface plasmon resonance phenomenon, the test thin film transistor SP3 is turned on. In this case, the electrical characteristics of the channel formed in the semiconductor layer AL may be tested using the currents flowing through the second and third pads TPb and TPc.

The test thin film transistor SP3 is formed through the same process applied to form the thin film transistors included in the display apparatus. For instance, the test thin film transistor SP3 may have substantially the same electrical characteristics as that of the thin film transistor of the pixel, or the test thin film transistor SP3 may have substantially the same electrical characteristics as that of the thin film transistor of the driving circuit part DC.

As described above, the test method of the display apparatus may test semiconductor characteristics or on-off characteristics of the test thin film transistor by driving the test thin film transistor SP3. Accordingly, the electrical characteristics of the display apparatus may be easily tested without some probe devices making contact with the thin film transistor.

Figure 12:
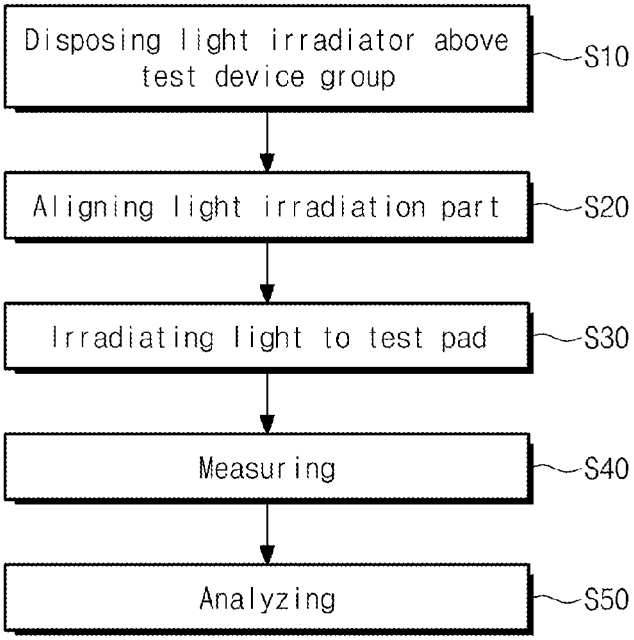
FIG. 12 is a flowchart showing a method of testing a display apparatus according to an exemplary embodiment of the present disclosure.
Figure 13:
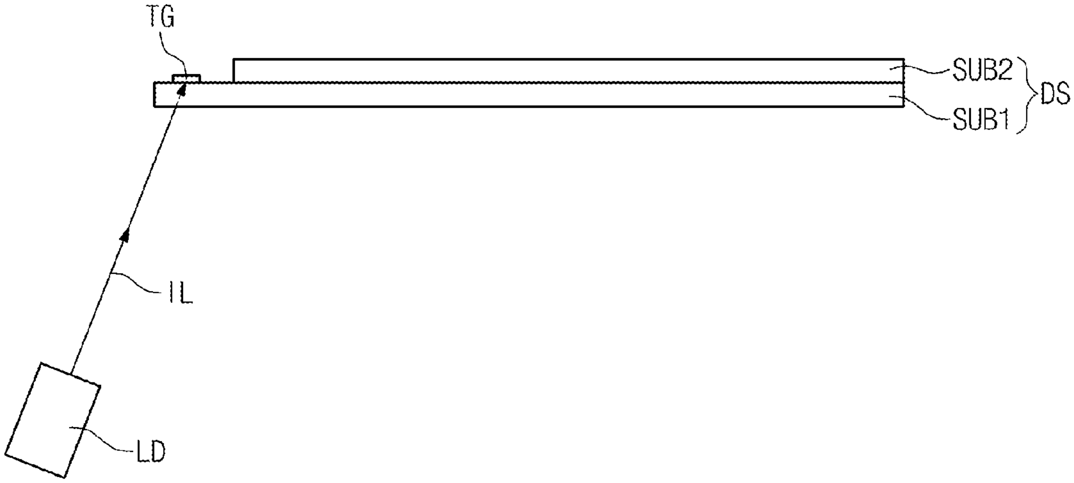
FIG. 13 is a side view showing a test method of a display apparatus according to an exemplary embodiment of the present disclosure.

FIG. 12 is a flowchart showing a method of testing a display device according to an exemplary embodiment of the present disclosure and FIG. 13 is a side view showing a test method of a display device according to an exemplary embodiment of the present disclosure. In FIGS. 12 and 13, the same reference numerals denote the same elements in FIGS. 1 to 11B, and thus detailed descriptions of the same elements will be omitted.

Referring to FIG. 12, the test method of the display apparatus includes irradiating the electromagnetic wave to the display apparatus and testing the electrical characteristics of the display apparatus. The electromagnetic wave is irradiated using the light to cause the surface plasmon resonance.

The irradiating of the electromagnetic wave starts with providing a light irradiator on the display apparatus (S10). The light irradiator irradiates the polarization light in the transverse magnetic mode.

Then, a light irradiation part LD of the light irradiator is aligned to the test device group TG (S20). The light irradiation part emits the light to the test device group TG. FIG. 13 shows only the light irradiation part LD of the light irradiator.

Then, the light IL is irradiated to the test pad of the display apparatus (S30). The light irradiation part LD is aligned to face the test device group TF of the display apparatus. The light IL is incident to the test pad of the test device group TG.

Then, various electrical characteristics of the test device group TG is measured while irradiating the light IL to the test pad (S40). The measuring the various electrical characteristics of the test device group TG may be performed to measure an electrical characteristic of the signal lines activated by the surface electric charge induced to the test pad. The characteristic may vary according to test pattern configurations.

The measuring may be performed by an electric field sensor in the display area to sense an electric field generated in the plurality of signal lines and check a signal line, from which the electric field is not sensed, among the plurality of signal lines to detect an opened signal line among the plurality of signal lines.

The measuring may be performed by detecting a pixel displaying a pixel image among the pixels connected to the plurality of signal lines and determining a pixel displaying a different pixel image among the pixels to detect an opened signal line among the plurality of signal lines.

The measuring may be performed by a test circuit part which is a test conductive line in which one end thereof is connected to a first pad, the first pad connected to the plurality of signal lines and covered by an insulating layer, and the other end thereof is connected to a second pad, the second pad exposed from the insulating layer. The test circuit part receives an electrical signal generated by the surface electric charge in the first pad and provided through the second pad to test a line resistance of the test circuit part.

The measuring may be performed by a test circuit part including a first electrode connected to a first pad, the first pad connected to the plurality of signal lines and covered by an insulating layer, and a second electrode connected to a second pad, the second pad exposed from the insulating layer, and overlapped with the first electrode such that the insulating layer is disposed between the first and second electrode. The test circuit part determines an electric potential difference between the first and second electrodes, which is generated in response to an electric potential of the first electrode induced by the surface electric charge.

The measuring may be performed by a test circuit part including a thin film transistor. The thin film transistor includes a control electrode connected to a first pad, the first pad connected to the plurality of signal lines and covered by an insulating layer, an input electrode connected to a second pad, the second pad exposed from the insulating layer, and an output electrode connected to a third pad, the third pad exposed from the insulating layer. The test circuit part determines a current flowing through the second and third pads to check an electrical characteristic of the thin film transistor.

After that, the measured characteristics of the test group TG are analyzed to determine whether or not the device is in an optimal condition (S50).

As shown in FIG. 13, the light irradiation part LD is aligned to face the lower surface of the test pad. Accordingly, the light irradiation part LD is disposed at the rear side of the display apparatus DS. The surface plasmon wave induced to the test pad travels along the upper surface of the test pad.

As another ways, although not shown in figures, the light irradiation part may be aligned to face the upper surface of the test pad. Therefore, the light irradiation part is disposed at the front side of the display apparatus. In this case, the surface plasmon wave induced to the test pad travels along the lower surface of the test pad.

Thus, the light IL is irradiated to the peripheral area in which the test device group TG is disposed. The light IL is incident to the test pad at the incident angle that satisfies the resonance angle to induce the maximum surface plasmon resonance on the surface of the test device group TG.

The test method of the display apparatus may test various electrical characteristics of the display apparatus. For instance, the test method of the display apparatus may test the electrical characteristics of the signal lines disposed in the display apparatus.

The testing of the electrical characteristics of the signal lines is performed using the electric field sensor. When the surface electric charges are induced on the test pad by the surface plasmon resonance phenomenon, the signal lines connected to the test pad are activated and the electric field is induced. In this case, the electric sensor is disposed in the display area and the signal lines are checked whether they are activated or not using the electric field sensor. The test method of the display apparatus may check whether the signal lines are opened or not on the basis of the activation of the signal lines.

As another way, the testing of the electrical characteristics of the signal lines may be performed by checking whether the image is displayed in the display area or not. When the surface electric charges are induced on the test pad by the surface plasmon resonance phenomenon, the signal lines connected to the test pad are activated and the pixels connected to the signal lines are operated.

When the light is supplied to the display apparatus, the light transmits through the pixels and the image is displayed in the display area DA. The pixels connected to the signal lines, which is not activated, among the signal lines display the white image or do not display the image. Accordingly, the test method of the display apparatus may check the open defect of the signal lines through the non-contact scheme.

In addition, the test method of the display apparatus may test capacitance characteristics of the display apparatus. To this end, the test device group, which includes the electrodes spaced apart from each other such that the insulating layers are disposed therebetween, is formed in the peripheral area PA.

Then, the surface plasmon resonance is induced on the test pad to activate the test device group TG. The capacitance of the test device group TG is measured to check a parasitic capacitance or a storage capacitance existing in the display apparatus.

As another way, the test method of the display apparatus may test the electrical characteristics of the thin film transistor included in the display apparatus. To this end, the test device group TG corresponding to the thin film transistor of the pixels disposed in the display area DA or the thin film transistor of the driving circuit part DC disposed in the peripheral area PA is formed in the peripheral area PA.

Then, the surface plasmon resonance is generated on the test pad TP to activate the test device group TG. In this case, the test device group TG has substantially the same electrical characteristics as that of the thin film transistor of the display apparatus. Accordingly, the test method of the display apparatus may test the electrical characteristics of the display apparatus by testing the test device group TG.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display apparatus comprising:

a base substrate comprising a display area in which a plurality of pixels connected to a plurality of signal lines is disposed and a peripheral area disposed adjacent to the display area; and a test device group comprising a first pad on which a surface plasmon resonance is induced due to an electromagnetic wave incident to the first pad, a test circuit part connected to the first pad, and a second pad connected to the test circuit part, the first pad being disposed in the peripheral area and a surface of the first pad being completely covered by an insulating layer, wherein the test circuit part comprises:

a first electrode connected to the first pad; and a second electrode connected to the second pad to overlap with the first electrode, and the insulating layer is disposed between the first electrode and the second electrode.

2. The display apparatus of claim 1, wherein the electromagnetic wave is a polarization light in a transverse magnetic mode.

3. The display apparatus of claim 2, further comprising a prism disposed on a rear surface of the base substrate to overlap with the first pad and to receive the electromagnetic wave, wherein the first pad is disposed on a front surface of the base substrate, which is opposite to the rear surface.

4. The display apparatus of claim 3, wherein the prism has a shape integrally formed with the base substrate.

5. The display apparatus of claim 1, wherein the first pad is connected to at least one of the plurality of signal lines.

6. The display apparatus of claim 5, wherein the first pad is disposed on a same layer as the plurality of signal lines.

7. The display apparatus of claim 1, wherein the second pad is exposed from the insulating layer.

8. The display apparatus of claim 7, wherein the test circuit part comprises a test signal line in which one end thereof is connected to the first pad and the other end thereof is connected to the second pad, and the test signal line has substantially a same linear resistance as that one of the plurality of signal lines.

9. The display apparatus of claim 8, wherein the first pad is disposed on a same layer as the test signal line.

10. The display apparatus of claim 1, wherein the test device group further comprises a third pad connected to the test circuit part, spaced apart from the first and second pads, and exposed from the insulating layer, and the test circuit part comprises a control electrode connected to the first pad, an input electrode connected to the second pad, and an output electrode connected to the third pad.

11. The display apparatus of claim 10, wherein the first pad is disposed on a same layer as the control electrode.

* * * * *